United States Patent
Ling

(10) Patent No.: US 10,163,183 B2
(45) Date of Patent: Dec. 25, 2018

(54) RENDERING PERFORMANCE USING DYNAMICALLY CONTROLLED SAMPLES

(71) Applicant: Rockwell Collins, Inc., Cedar Rapids, IA (US)

(72) Inventor: Jeanette M. Ling, Park City, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 138 days.

(21) Appl. No.: 14/994,938

(22) Filed: Jan. 13, 2016

(65) Prior Publication Data
US 2017/0200253 A1 Jul. 13, 2017

(51) Int. Cl.
- *G06T 1/20* (2006.01)
- *G06T 1/60* (2006.01)
- *G09G 5/399* (2006.01)

(52) U.S. Cl.
CPC .......... *G06T 1/20* (2013.01); *G06T 1/60* (2013.01); *G09G 5/399* (2013.01); *G09G 2340/0435* (2013.01); *G09G 2350/00* (2013.01)

(58) Field of Classification Search
CPC .............................. G06T 1/20; G06T 15/503
USPC ............................................ 345/501
See application file for complete search history.

(56) References Cited

U.S. PATENT DOCUMENTS

| | | | |
|---|---|---|---|
| 5,388,206 A * | 2/1995 | Poulton | G06T 15/005 345/505 |
| 5,889,529 A | 3/1999 | Jones et al. | |
| 6,535,220 B2 * | 3/2003 | Deering | G06T 3/40 345/582 |
| 8,681,154 B1 | 3/2014 | Gardiner | |
| 2001/0033287 A1 * | 10/2001 | Naegle | G06T 15/503 345/601 |
| 2002/0140706 A1 * | 10/2002 | Peterson | G06T 11/40 345/611 |
| 2016/0203578 A1 * | 7/2016 | Shoshan | G06T 3/4007 345/428 |

FOREIGN PATENT DOCUMENTS

WO 1997035281 A1 9/1997

* cited by examiner

*Primary Examiner* — Shivang Patel
(74) *Attorney, Agent, or Firm* — Angel N. Gerdzhikov; Donna P. Suchy; Daniel M. Barbieri

(57) ABSTRACT

Systems and methods for improving rendering performance of graphics processors are disclosed. A graphics processor may be configured to maintain access to multiple framebuffer sets stored in a non-transitory processor-readable medium. Two or more framebuffer sets may be configured to support different numbers of samples per pixel. The graphics processor may be further configured to determine whether a performance metric of a first frame processed using a first framebuffer set exceeded a threshold. The graphics processor may select a second framebuffer set with a reduced number of samples per pixel compared to the first framebuffer set when the performance metric of the first frame exceeded the threshold and process a second frame for display to a viewer utilizing the second framebuffer set.

20 Claims, 3 Drawing Sheets

RENDERING PERFORMANCE USING DYNAMICALLY CONTROLLED SAMPLES

BACKGROUND

Three-dimensional (3D) graphics are graphics (e.g., video frames or still images) rendered using 3D representations of geometric data. Certain 3D graphics may include scenes with objects that overlap each other, and objects that are farther away from a viewer's perspective may appear to be blocked (or partially blocked) by objects that are closer to the viewer. The complexity associated with rendering overlapping objects at different depths may be referred to as the depth-complexity.

It is noted that as the number of objects overlapping with each other in a given frame increases, the depth-complexity increases as a result, and a graphics processor may need to process the pixels in the overlapping regions multiple times (e.g., once per overlapping object) to determine how each pixel should be rendered. The increase of the depth-complexity may therefore reduce the speed at which the frames can be rendered by the graphics processor. Since the graphics processor may be required to maintain a certain frame rate (e.g., 60 frames per second), the performance of the rendering process may therefore need to be improved to avoid dropping below the required frame rate.

SUMMARY

In one aspect, embodiments of the inventive concepts disclosed herein are directed to an apparatus. The apparatus may include a non-transitory processor-readable medium and a graphics processor in communication with the non-transitory processor-readable medium. The graphics processor may be configured to maintain access to multiple framebuffer sets stored in the non-transitory processor-readable medium. Two or more framebuffer sets may be configured to support different numbers of samples per pixel. The graphics processor may be further configured to determine whether a performance metric of a first frame processed using a first framebuffer set exceeded a threshold. The graphics processor may select a second framebuffer set with a reduced number of samples per pixel compared to the first framebuffer set when the performance metric of the first frame exceeded the threshold and process a second frame for display to a viewer utilizing the second framebuffer set with the reduced number of samples per pixel.

In a further aspect, embodiments of the inventive concepts disclosed herein are directed to an apparatus. The apparatus may include a non-transitory processor-readable medium and a graphics processor in communication with the non-transitory processor-readable medium. The graphics processor may be configured to maintain access to multiple framebuffer sets stored in the at least one non-transitory processor-readable medium. Two or more framebuffer sets may be configured to support different numbers of samples per pixel. The graphics processor may be further configured to determine whether a performance metric of a first frame processed using a first framebuffer set exceeded an upper threshold or dropped below a lower threshold. When the performance metric of the first frame exceeded the upper threshold, the graphics processor may select a second framebuffer set with a reduced number of samples per pixel compared to the first framebuffer set and process a second frame for display to a viewer utilizing the second framebuffer set with the reduced number of samples per pixel. When the performance metric of the first frame dropped below the lower threshold, the graphics processor may select a second framebuffer set with an increased number of samples per pixel compared to the first framebuffer set and process the second frame for display to the viewer utilizing the second framebuffer set with the increased number of samples per pixel.

In another aspect, embodiments of the inventive concepts disclosed herein are directed to a method. The method may include: providing a graphics processor access to multiple framebuffer sets, where two or more framebuffer sets support different numbers of samples per pixel; determining whether a performance metric of a first frame processed using a first framebuffer set exceeded a threshold; selecting a second framebuffer set with a reduced number of samples per pixel compared to the first framebuffer set when the performance metric of the first frame exceeded the upper threshold; processing a second frame utilizing the second framebuffer set with the reduced number of samples per pixel; and displaying the second frame to a viewer.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
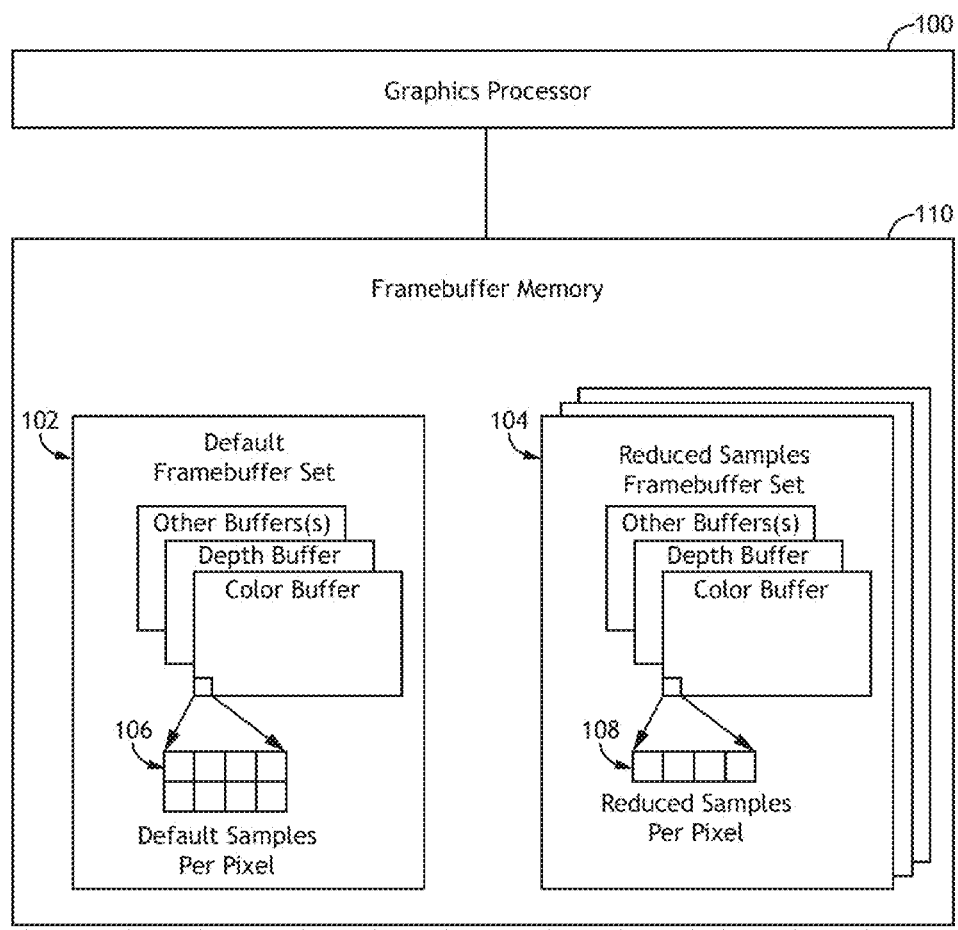
FIG. 1 is a block diagram depicting a graphics processor according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein may be configured to help improve rendering performance of graphics processors by dynamically controlling the number of anti-aliasing samples (may be referred to simply as samples) per pixel on a frame-by-frame basis. Anti-aliasing may be used by graphics processors to help improve image qualities. To render a frame representing objects in a 3D space for a graphics application, a graphics processor may select a number of anti-aliasing samples per pixel for a framebuffer when the graphics application is first initialized. The graphics application may then create a set of 3D rendering framebuffer surfaces using the selected number of samples. It is contemplated that dynamically controlling the number of samples per pixel may allow graphics processors to quickly adapt to the operating conditions and to adjust the rendering performance without introducing significant undesirable visual anomalies or effects on display quality.

Referring now to FIG. 1, a block diagram depicting an exemplary graphics processor 100 configured in accordance with the inventive concepts disclosed herein is shown. The graphics processor 100 may include one or more dedicated processing devices, application-specific integrated circuits (ASICs), field-programmable gate arrays (FPGAs), or various other types of processors or processing devices configured to provide graphics processing functionalities. The graphics processor 100 may be configured with access to a plurality of framebuffer sets 102 and 104 stored in a framebuffer memory 110 (a non-transitory processor-readable medium). The plurality of framebuffer sets 102 and 104 may support different numbers of samples per pixel (shown as 106 and 108, respectively). It is contemplated that the graphics processor 100 may produce the samples 106 per pixel in the framebuffer set 102 and perform anti-aliasing processes (e.g., multisample anti-aliasing and/or other processes) using the framebuffer set 102. The graphics processor 100 may also maintain one or more framebuffer set 104 with fewer samples 108 per pixel. By reducing the number of samples 108 per pixel, options are provided for the graphics processor 100 to process a frame faster using the framebuffer set 104 compared to using the framebuffer set 102.

It is to be understood that while the framebuffer sets 102 and 104 are shown to support 8 and 4 samples per pixel, respectively, such depictions are merely exemplary and are not meant to be limiting. It is contemplated that the number of samples per pixel supported by the various framebuffer sets 102 and 104 may vary without departing from the broad scope of the inventive concepts disclosed herein. It is also contemplated that the number of framebuffer sets 102 and 104 accessible to the graphics processor 100 may vary without departing from the broad scope of the inventive concepts disclosed herein.

It is further contemplated that the framebuffer sets 102 and 104 are not required to be implemented as physically separated buffers. For instance, the framebuffer sets 102 and 104 may be stored in the same section of the framebuffer memory 110, and the graphics processor 100 may reference a subset of the framebuffer set 102 as the framebuffer set 104. It is contemplated that the plurality of framebuffer sets 102 and 104 may be stored in various other manners without departing from the broad scope of the inventive concepts disclosed herein, as long as each framebuffer set of the plurality of framebuffer sets 102 and 104 can be recognized and independently accessed by the graphics processor 100.

It is noted that the width-by-height pixel resolution of each framebuffer set 102 and 104 may be configured to be the same in certain implementations, with only the number of samples per pixel being different between the framebuffer sets 102 and 104. In some embodiments, the framebuffer set with the most number of samples per pixel may be designated as the default framebuffer set used by the graphics processor 100. It is to be understood, however, that such a configuration may change without departing from the broad scope of the inventive concepts disclosed herein.

Figure 2:
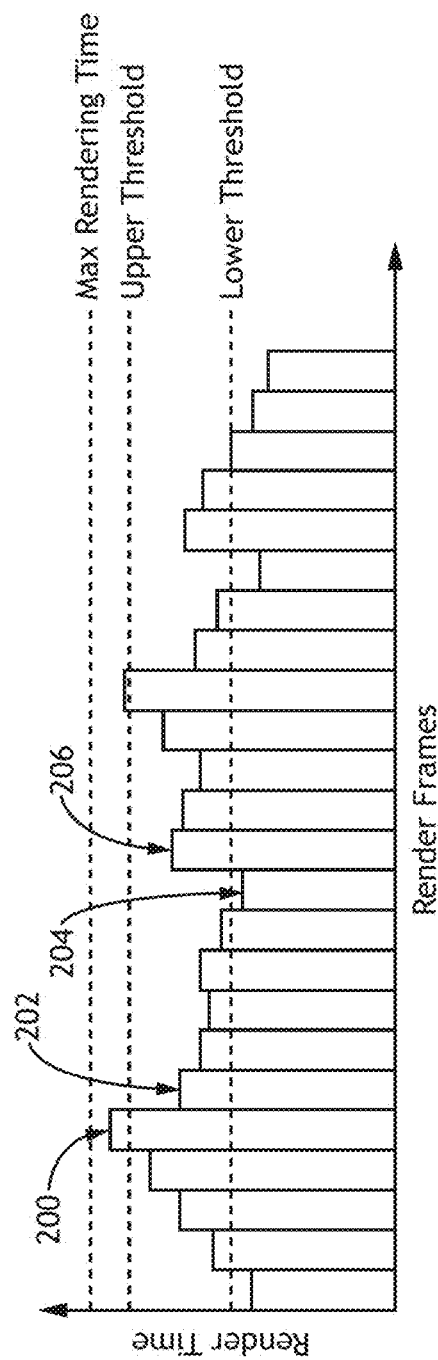
FIG. 2 is an illustration depicting a rendering performance based framebuffer set selection process according to an exemplary embodiment of the inventive concepts disclosed herein.

FIG. 2 is an illustration that shows how the framebuffer sets 102 and 104 can be dynamically selected based on rendering performance. For illustrative purposes, suppose the graphics processor 100 is required to maintain a rate of x-number of frames per second, meaning that the rendering time for each frame cannot exceed the maximum of 1/x second (which is indicated as the maximum rendering time allowed in FIG. 2 as an example). To help prevent the actual rendering time from exceeding the maximum rendering time allowed, a configurable upper threshold may be established (system-determined or user-defined) so that when the graphics processor 100 encounters a frame (e.g., with high depth-complexity) that takes more time to render than the established upper threshold, the graphics processor 100 may decide to take appropriate actions in order to reduce the rendering time as needed.

More specifically, as shown in FIG. 2, the graphics processor 100 may be configured to use the default framebuffer set 102 up to frame 200, which is a frame that took more time to render than the established upper threshold. The graphics processor 100 may then decide to reduce the number of samples per pixel by selecting the framebuffer set 104 starting at a subsequent frame 202, effectively reducing the overall rendering time for the subsequent frame 202. The graphics processor 100 may continue to use the framebuffer set 104 to render additional subsequent frames, and if another frame rendered using the framebuffer set 104 took more time to render than the established upper threshold again, the graphics processor 100 may decide to reduce the number of samples per pixel even further by selecting a framebuffer set supporting further-reduced samples per pixel.

The graphics processor 100 may also have the option to increase the number of samples per pixel when appropriate. For example, suppose the graphics processor 100 continues to use the framebuffer set 104 to render the frames, and further suppose that the frames become less complex to render (e.g., with reduced depth-complexity), down to a point where a frame 204 took less time to render than a configurable lower threshold (may be system-determined or user-defined). The graphics processor 100 may then decide to increase the number of samples per pixel starting at a subsequent frame 206. In this manner, the graphics processor 100 may eventually work back to using the default framebuffer set 102 with the most samples per pixel if the rendering performance allows for it to happen.

It is to be understood that while the upper and lower thresholds may remain the same as depicted in FIG. 2, such a configuration is merely exemplary and is not meant to be limiting. It is contemplated that the upper and/or the lower thresholds may be configured differently depending on the framebuffer set that was used. For instance, the upper and/or the lower thresholds may be set at certain levels if the framebuffer set 102 is used, but the upper and/or the lower thresholds may be changed to different levels if the framebuffer set 104 is used instead.

It is contemplated that the graphics processor 100 may continue to monitor the rendering time of the frames and determine whether the number of samples per pixel should be reduced, increased, or remain the same. The graphics processor 100 may therefore continue to select an appropriate one of the plurality of framebuffer sets 102 and 104 based on whether the number of samples per pixel should be reduced, increased, or maintained. The graphics processor 100 configured in this manner may incur very little visual differences when operating in a performance enhancement mode (e.g., when the framebuffer set 104 is used) in comparison to a normal operation mode (e.g., when the default framebuffer set 102 is used) since the graphics processor 100 does not need to change the content of the scene nor the pixel shader complexity. Instead, the graphics processor 100 may dynamically control the number of samples per pixel on a frame-by-frame basis and increase the number of samples per pixel when allowed. Additionally, since high depth-complexity scenes are often encountered in fuzzy, low visibility situations like looking through clouds or smoke, decreases in anti-aliasing quality when operating in the performance enhancement mode may be negligible.

Figure 3:
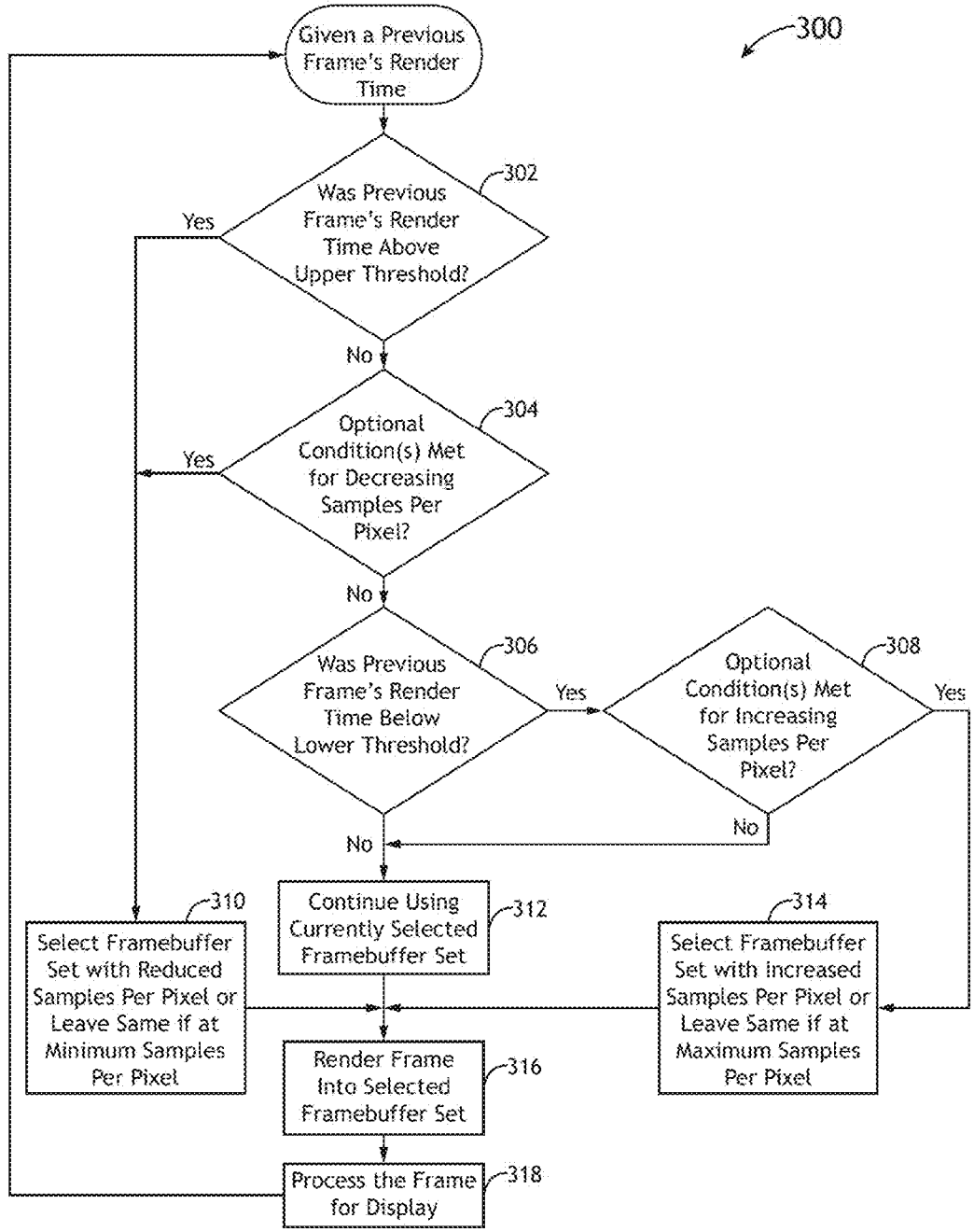
FIG. 3 is a flow diagram depicting a graphics rendering method according to an exemplary embodiment of the inventive concepts disclosed herein.

Referring now to FIG. 3, a flow diagram depicting an exemplary graphics rendering method 300 configured in accordance with the inventive concepts disclosed herein is shown. As illustrated in FIG. 3, a previously rendered frame is analyzed to help determine how a subsequent frame may be processed. More specifically, a determination step 302 may determine whether the rendering time of the previous frame exceeded an upper threshold or not. If the rendering time of the previous frame exceeded the upper threshold, a framebuffer set with reduced number of samples per pixel (compared to the framebuffer set currently in use) may be selected in a selection step 310 to process one or more subsequent frames. It is noted that if the framebuffer set currently in use is the framebuffer set that has the least number of samples per pixel (in other words, the number of samples per pixel cannot be reduced further), the framebuffer set may remain unchanged.

In certain implementations, some optional (and/or additional) control condition(s) may be taken into consideration in a determination step 304 to determine whether a framebuffer set with reduced number of samples per pixel should be selected. In such implementations, if the optional control conditions indicate that a framebuffer set with reduced number of samples per pixel should be selected, the selection step 310 may be invoked even if the rendering time of the previous frame did not exceed the upper threshold.

It is contemplated that various types of conditions may be utilized as optional control conditions. For example, a condition may be enforced to allow the selection of a framebuffer set with reduced number of samples per pixel if the detected gaze of the viewer is within proximity of a high depth-complexity region, such as in or near a cloud layer (e.g., for a flight simulator application). Other exemplary control conditions may include a switching frequency/rate limiter, as switching between the framebuffer sets too often may cause noticeable artifacts. A recovery time parameter may also be added to moderate the return to the default framebuffer set in certain implementations. Other conditions, such as whether the framebuffer set currently in use has the least or the greatest number of samples per pixel, and whether the rendering time of the previous frame dropped below a lower threshold, as well as a combination of such conditions, may all be taken into consideration in the determination step 304. It is to be understood that other types of conditions not specifically mentioned above may also be taken into consideration without departing from the broad scope of the inventive concepts disclosed herein.

Additionally, in certain implementations, a determination step 306 may be invoked to further determine whether the rendering time of the previous frame dropped below a lower threshold. If the rendering time of the previous frame did not drop below the lower threshold, no change may be needed and the framebuffer set currently in use may continue to be used in a step 312. On the other hand, if the rendering time of the previous frame dropped below the lower threshold, a framebuffer set with increased number of samples per pixel may be selected in a selection step 314 to process one or more subsequent frames. It is noted that if the framebuffer set currently in use is the framebuffer set that has the most number of samples per pixel (in other words, the number of samples per pixel cannot be increased further), the framebuffer set may remain unchanged.

It is contemplated that optional (and/or additional) control condition(s) may be taken into consideration in a determination step 308 to determine whether a framebuffer set with increased number of samples per pixel should indeed be selected (even if the rendering time of the previous frame dropped below the lower threshold). In certain implementations, the selection step 314 may be invoked only if the optional (additional) control conditions confirm that a framebuffer set with increased number of samples per pixel should indeed be selected.

Once the framebuffer set is selected based on the selection process described above, the selected framebuffer set may be used in a processing step 316 to process the frame currently being rendered so that the frame can be buffered into the selected framebuffer set to facilitate anti-aliasing processing on that frame. The frame may then be processed into a displayable image in a processing step 318, and the method 300 may repeat again for the next frame.

It is contemplated that various techniques may be utilized to facilitate the display of the displayable image. For instance, in an Open Graphics Library (OpenGL) based implementation, the frame being processed may be resolved to a single-sampled back buffer, which may be swapped to a display buffer for display. It is to be understood, however, that the implementation of OpenGL is merely exemplary and is not meant to be limiting. It is contemplated that other techniques may be utilized to facilitate the display of the displayable image without departing from the broad scope of the inventive concepts disclosed herein.

It is noted that while the examples presented above depicted using the rendering time as a performance metric, such an implementation is not meant to be limiting. It is contemplated that rendering performance may be measured using various other types of performance metrics. For instance, depth complexity, number of pixels processed for a frame, as well as various other types of performance metrics may be used instead of (or in addition to) the rendering time without departing from the broad scope of the inventive concepts disclosed herein.

It is also noted that while the examples presented above depicted monitoring rendering performance on a frame-by-frame basis, such an implementation is not meant to be limiting. Rendering performance may be monitored every n-number of frames, for example, where n is greater than or equal to one. It is also noted that regardless of the specific value of n, the switch to a reduced (fewer-sampled) framebuffer set is considered a temporary, performance enhancement effort, and has the potential to be made allowable only for particular circumstances where pixel fill-rate is limiting the performance of the graphics processor and/or when other optional control conditions (previously mentioned) are satisfied.

Furthermore, it is to be understood that while graphics processors for flight simulators are referenced in the examples described above, the systems and methods for improving rendering performance of graphics processors disclosed herein are not limited to applications in flight simulators. Graphics processors for other types of simulators, including ground vehicle simulators, maritime vehicle simulators, airborne vehicle simulators, space vehicle simulators, as well as graphics processors for various other types of graphics applications, may utilize the systems and methods for improving rendering performance as previously described without departing from the broad scope of the inventive concepts disclosed herein.

As will be appreciated from the above, graphics processors and graphics processing methods configured according to embodiments of the inventive concepts disclosed herein may allow the graphics processors to quickly adapt to the operating conditions and to adjust the rendering performance without introducing significant undesirable visual anomalies or effects on display quality.

It is contemplated that the systems and methods configured in accordance with the inventive concepts disclosed herein may be utilized to provide graphics processing for various types of display devices, including emissive displays, non-emissive displays, projection displays, head-mounted displays, head-worn displays, two-dimensional displays, and three-dimensional displays. It is also contemplated that a graphics processor configured in accordance with the inventive concepts disclosed herein may be implemented as a standalone or an embedded component of such a display device.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:
   at least one non-transitory processor-readable medium; and
   at least one graphics processor in communication with the at least one non-transitory processor-readable medium, the at least one graphics processor configured to, without changing scene content consisting of at least one of a first frame and a subsequent frame:
   maintain access to a plurality of framebuffer sets stored in the at least one non-transitory processor-readable medium, at least two framebuffer sets of the plurality of framebuffer sets being configured to support different numbers of samples per pixel;
determine whether a performance metric of the first frame processed using a first framebuffer set of the plurality of framebuffer sets exceeded a threshold;
select a second framebuffer set with a reduced number of samples per pixel compared to the first framebuffer set when the performance metric of the first frame exceeded the threshold; and
process the at least one subsequent frame for display to a viewer utilizing the second framebuffer set with the reduced number of samples per pixel.

2. The apparatus of claim 1, wherein the performance metric comprises a rendering time.

3. The apparatus of claim 1, wherein the at least one graphics processor is further configured to:
determine whether at least one control condition is satisfied for reducing the number of samples per pixel, the at least one control condition being different from the performance metric; and
select the second framebuffer set with the reduced number of samples per pixel when the at least one control condition is satisfied.

4. The apparatus of claim 1, wherein the threshold is an upper threshold, and wherein the at least one graphics processor is further configured to:
determine whether the performance metric of the first frame processed using the first framebuffer set dropped below a lower threshold; and
select a second framebuffer set with an increased number of samples per pixel compared to the first framebuffer set when the performance metric of the first frame dropped below the lower threshold; and
process the at least one subsequent frame for display to the viewer utilizing the second framebuffer set with the increased number of samples per pixel.

5. The apparatus of claim 4, wherein the upper threshold and the lower threshold are configurable at least partially based on at least one of: a frame rate requirement established for the graphics processor and a framebuffer set currently in use.

6. The apparatus of claim 4, wherein the at least one graphics processor is further configured to:
determine whether at least one control condition is satisfied for increasing the number of samples per pixel, the at least one control condition being different from the performance metric; and
select the second framebuffer set with the increased number of samples per pixel when the performance metric of the first frame dropped below the lower threshold and the at least one control condition is satisfied.

7. The apparatus of claim 6, wherein the default framebuffer set supports a greatest number of samples per pixel among the plurality of framebuffer sets.

8. The apparatus of claim 1, wherein one of the plurality of framebuffer sets is designated as a default framebuffer set.

9. The apparatus of claim 1, wherein the graphics processor is configured to provide graphics processing for a vehicle simulator.

10. An apparatus, comprising:
at least one non-transitory processor-readable medium; and
at least one graphics processor in communication with the at least one non-transitory processor-readable medium, the at least one graphics processor configured to, without changing scene content consisting of at least one of a first frame and a subsequent frame:
maintain access to a plurality of framebuffer sets stored in the at least one non-transitory processor-readable medium, at least two framebuffer sets of the plurality of framebuffer sets being configured to support different numbers of samples per pixel;
determine whether a performance metric of the first frame processed using a first framebuffer set of the plurality of framebuffer sets exceeded an upper threshold or dropped below a lower threshold;
when the performance metric of the first frame exceeded the upper threshold,
select a second framebuffer set with a reduced number of samples per pixel compared to the first framebuffer set, and
process the at least one subsequent frame for display to a viewer utilizing the second framebuffer set with the reduced number of samples per pixel; and
when the performance metric of the first frame dropped below the lower threshold,
select a second framebuffer set with an increased number of samples per pixel compared to the first framebuffer set, and
process the at least one subsequent frame for display to the viewer utilizing the second framebuffer set with the increased number of samples per pixel.

11. The apparatus of claim 10, wherein the upper threshold and the lower threshold are configurable at least partially based on at least one of: a frame rate requirement established for the graphics processor and a framebuffer set currently in use.

12. The apparatus of claim 10, wherein the at least one graphics processor is further configured to:
determine whether at least one control condition is satisfied for reducing the number of samples per pixel, the at least one control condition being different from the performance metric; and
select the second framebuffer set with the reduced number of samples per pixel when the at least one control condition is satisfied.

13. The apparatus of claim 10, wherein the at least one graphics processor is further configured to:
determine whether at least one control condition is satisfied for increasing the number of samples per pixel, the at least one control condition being different from the performance metric; and
select the second framebuffer set with the increased number of samples per pixel when the performance metric of the first frame dropped below the lower threshold and the at least one control condition is satisfied.

14. The apparatus of claim 10, wherein one of the plurality of framebuffer sets is designated as a default framebuffer set.

15. The apparatus of claim 14, wherein the default framebuffer set supports a greatest number of samples per pixel among the plurality of framebuffer sets.

16. The apparatus of claim 10, wherein the graphics processor is configured to provide graphics processing for a vehicle simulator.

17. A method, comprising:
providing a graphics processor access to a plurality of framebuffer sets, at least two framebuffer sets of the plurality of framebuffer sets support different numbers of samples per pixel;

determining whether a performance metric of a first frame processed using a first framebuffer set of the plurality of framebuffer sets exceeded a threshold;

selecting a second framebuffer set with a reduced number of samples per pixel compared to the first framebuffer set when the performance metric of the first frame exceeded the threshold;

without changing scene content consisting of at least one of the first frame and a subsequent frame, processing at least one subsequent frame utilizing the second framebuffer set with the reduced number of samples per pixel; and displaying the at least one subsequent frame to a viewer.

18. The method of claim 17, wherein the threshold is an upper threshold, and the method further comprising:

determining whether the performance metric of the first frame processed using the first framebuffer set dropped below a lower threshold; and selecting a second framebuffer set with an increased number of samples per pixel compared to the first framebuffer set when the performance metric of the first frame dropped below the lower threshold; and processing the at least one subsequent frame utilizing the second framebuffer set with the increased number of samples per pixel.

19. The method of claim 18, wherein the upper threshold and the lower threshold are configurable at least partially based on at least one of: a frame rate requirement established for the graphics processor and a framebuffer set currently in use.

20. The method of claim 19, further comprising:

determining whether at least one control condition is satisfied for reducing or increasing the number of samples per pixel, the at least one control condition being different from the performance metric; and selecting the second framebuffer set based on at least one of: whether the performance metric of the first frame exceeded the upper threshold or dropped below the lower threshold and whether the at least one additional control condition is satisfied.

\* \* \* \* \*